(12) United States Patent
Ivacko et al.

(10) Patent No.: US 8,131,435 B2
(45) Date of Patent: Mar. 6, 2012

(54) TRANSMISSION UPSHIFT RUN-THROUGH DETECTION AND CONTROL

(75) Inventors: Joseph P Ivacko, Fenton, MI (US); James Robert Somerville, West Bloomfield, MI (US); John J. Koenig, Howell, MI (US); Andriy Nikitin, Hartland, MI (US)

(73) Assignee: GM Global Technology Operations LLC

( * ) Notice: Subject to any disclaimer, the term of this patent is extended or adjusted under 35 U.S.C. 154(b) by 766 days.

(21) Appl. No.: 12/255,722

(22) Filed: Oct. 22, 2008

(65) Prior Publication Data

US 2009/0312921 A1    Dec. 17, 2009

Related U.S. Application Data

(60) Provisional application No. 61/061,259, filed on Jun. 13, 2008.

(51) Int. Cl.
*F16H 61/04* (2006.01)
*B60W 10/04* (2006.01)

(52) U.S. Cl. ............... 701/50; 180/197; 477/107

(58) Field of Classification Search ............... 701/50, 701/87, 88, 90, 91; 180/197; 477/107, 109, 477/127, 128, 413, 115, 120, 143, 156
See application file for complete search history.

(56) References Cited

U.S. PATENT DOCUMENTS

| | | | | | |
|---|---|---|---|---|---|
| 3,886,819 | A | * | 6/1975 | Lentz | 477/128 |
| 4,220,058 | A | * | 9/1980 | Petzold | 475/125 |
| 4,706,522 | A | * | 11/1987 | Nitz | 477/61 |
| 5,349,885 | A | * | 9/1994 | Yoshimura et al. | 477/61 |
| 6,009,967 | A | * | 1/2000 | Hrovat | 180/197 |
| 6,123,164 | A | * | 9/2000 | Hrovat | 180/197 |
| 7,351,183 | B2 | * | 4/2008 | Fujii et al. | 477/109 |
| 7,503,875 | B2 | * | 3/2009 | Fujii et al. | 477/107 |

* cited by examiner

*Primary Examiner* — Robert Pezzuto

(57) ABSTRACT

A control system for a transmission of a vehicle comprises an actuation module and an upshift control module. The transmission has a first gear that corresponds to a first transmission ratio and a second gear that corresponds to a second transmission ratio that is less than the first transmission ratio. The actuation module controls an amount torque transferred to the second gear using a friction device. The upshift control module selectively increases the amount of torque transferred to the second gear based on a comparison of the first transmission ratio and a measured transmission ratio at a predetermined period of time after an upshift to the second gear is commanded, wherein the measured transmission ratio is determined based on an input speed of the transmission divided by an output speed of the transmission.

17 Claims, 4 Drawing Sheets

TRANSMISSION UPSHIFT RUN-THROUGH DETECTION AND CONTROL

CROSS-REFERENCE TO RELATED APPLICATIONS

This application claims the benefit of U.S. Provisional Application No. 61/061,259, filed on Jun. 13, 2008. The disclosure of the above application is incorporated herein by reference in its entirety.

FIELD

The present disclosure relates to vehicle transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles generally include an engine that generates torque to propel the vehicle. Vehicles also include a transmission that transfers torque from the engine to wheels of the vehicle. The engine produces torque by combusting a mixture of air and fuel within cylinders of the vehicle. Torque produced by an electric motor may also be provided to the transmission. An engine controller controls torque output to the transmission.

A transmission controller controls various components of the transmission to transfer torque to the wheels of the vehicle. More specifically, the transmission controller controls a plurality of friction devices (e.g., clutches, bands, etc.) within the transmission to adjust the amount of torque transferred to the wheels using gears within the transmission. In other words, the transmission controller controls gear shifts within the transmission to adjust torque transfer to the wheels of the vehicle.

To shift from a first gear to a second gear, the transmission controller adjusts one or more of the friction devices to decrease the amount of torque transferred to the wheels via the first gear and increase torque transferred to the wheels via the second gear. The transmission controller adjusts the friction devices in a manner to provide a driver of the vehicle with a desirable shift feel during the shift to the second gear and after the second gear is engaged.

SUMMARY

A control system for a transmission of a vehicle comprises an actuation module and an upshift control module. The transmission has a first gear that corresponds to a first transmission ratio and a second gear that corresponds to a second transmission ratio that is less than the first transmission ratio. The actuation module controls an amount torque transferred to the second gear using a friction device. The upshift control module selectively increases the amount of torque transferred to the second gear based on a comparison of the first transmission ratio and a measured transmission ratio at a predetermined period of time after an upshift to the second gear is commanded, wherein the measured transmission ratio is determined based on an input speed of the transmission divided by an output speed of the transmission.

In further features, the upshift control module increases the amount of torque transferred to the second gear when the measured transmission ratio is equal to the first transmission ratio at the predetermined period after the shift to the second gear is commanded.

In other features, the upshift control module increases the amount of torque transferred to the second gear based on at least one of a shift torque, the second transmission ratio, and a period of time based on a current time and the predetermined period.

In still other features, the friction device comprises a friction band.

In further features, the first transmission ratio corresponds to a highest transmission ratio of the transmission and the second transmission ratio corresponds to a second-highest transmission ratio of the transmission.

In other features, the upshift control module increases the amount of torque transferred to the second gear when a slope of the measured transmission ratio is greater than a threshold, the measured transmission ratio is less than the first transmission ratio, and the measured transmission ratio is greater than the second transmission ratio.

In further features, the upshift control module increases the amount of torque transferred to the second gear based on at least one of a shift torque, a difference between the slope and the threshold, and a period of time during which the slope is greater than the threshold.

In still further features, the threshold is determined based on the measured transmission ratio and a shift torque.

In other features, the slope is determined based on a derivative of the measured transmission ratio.

In still other features, the slope is determined based on an eight-point Savitzky-Golay filter.

A control system for a transmission of a vehicle comprises an actuation module and an upshift control module. The transmission has a first gear that corresponds to a first transmission ratio and a second gear that corresponds to a second transmission ratio that is less than the first transmission ratio. The actuation module controls an amount torque transferred to the second gear using a friction device. The upshift control module increases the amount of torque transferred to the second gear when a slope of a measured transmission ratio is greater than a threshold, the measured transmission ratio is greater than the second ratio, and the measured transmission ratio is less than the first ratio, wherein the measured transmission ratio is determined based on an input speed of the transmission divided by an output speed of the transmission.

In further features, the upshift control module increases the amount of torque transferred to the second gear based on at least one of a shift torque, a difference between the slope and the threshold, and a period of time during which the slope is greater than the threshold.

In other features, the threshold is determined based on the measured transmission ratio and a shift torque.

In still other features, the slope is determined based on a derivative of the measured transmission ratio.

In further features, the slope is determined based on an eight-point Savitzky-Golay filter.

In other features, the friction device comprises a friction band.

In still other features, the first transmission ratio corresponds to a highest transmission ratio of the transmission and the second transmission ratio corresponds to a second-highest transmission ratio of the transmission.

A method for a transmission of a vehicle comprises controlling and selectively increasing. The transmission has a first gear that corresponds to a first transmission ratio and a second gear that corresponds to a second transmission ratio that is less than the first transmission ratio. The controlling comprises controlling an amount torque transferred to the second gear using a friction device. The selectively increasing comprises selectively increasing the amount of torque transferred to the second gear based on a comparison of the first transmission ratio and a measured transmission ratio at a predetermined period of time after an upshift to the second gear is commanded, wherein the measured transmission ratio is determined based on an input speed of the transmission divided by an output speed of the transmission.

In other features, the selectively increasing comprises increasing the amount of torque transferred to the second gear when the measured transmission ratio is equal to the first transmission ratio at the predetermined period after the shift to the second gear is commanded.

In still other features, the selectively increasing comprises increasing the amount of torque transferred to the second gear based on at least one of a shift torque, the second transmission ratio, and a period of time based on a current time and the predetermined period.

In further features, the friction device comprises a friction band.

In still further features, the first transmission ratio corresponds to a highest transmission ratio of the transmission and the second transmission ratio corresponds to a second-highest transmission ratio of the transmission.

In other features, the selectively increasing comprises increasing the amount of torque transferred to the second gear when a slope of the measured transmission ratio is greater than a threshold, the measured transmission ratio is less than the first transmission ratio, and the measured transmission ratio is greater than the second transmission ratio.

In still other features, the increasing comprises increasing the amount of torque transferred to the second gear based on at least one of a shift torque, a difference between the slope and the threshold, and a period of time during which the slope is greater than the threshold.

In further features, the method further comprises determining the threshold based on the measured transmission ratio and a shift torque.

In still further features, the method further comprises determining the slope based on a derivative of the measured transmission ratio.

In other features, the method further comprises determining the slope based on an eight-point Savitzky-Golay filter.

A method for a transmission of a vehicle comprises controlling and increasing. The transmission has a first gear that corresponds to a first transmission ratio and a second gear that corresponds to a second transmission ratio that is less than the first transmission ratio. The controlling comprises controlling an amount torque transferred to the second gear using a friction device. The increasing comprises increasing the amount of torque transferred to the second gear when a slope of a measured transmission ratio is greater than a threshold, the measured transmission ratio is greater than the second ratio, and the measured transmission ratio is less than the first ratio, wherein the measured transmission ratio is determined based on an input speed of the transmission divided by an output speed of the transmission.

In further features, the increasing comprises increasing the amount of torque transferred to the second gear based on at least one of a shift torque, a difference between the slope and the threshold, and a period of time during which the slope is greater than the threshold.

In still further features, the method further comprises determining the threshold based on the measured transmission ratio and a shift torque.

In other features, the method further comprises determining the slope based on a derivative of the measured transmission ratio.

In further features, the method further comprises determining the slope based on an eight-point Savitzky-Golay filter.

In other features, the friction device comprises a friction band.

In still other features, the first transmission ratio corresponds to a highest transmission ratio of the transmission and the second transmission ratio corresponds to a second-highest transmission ratio of the transmission.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
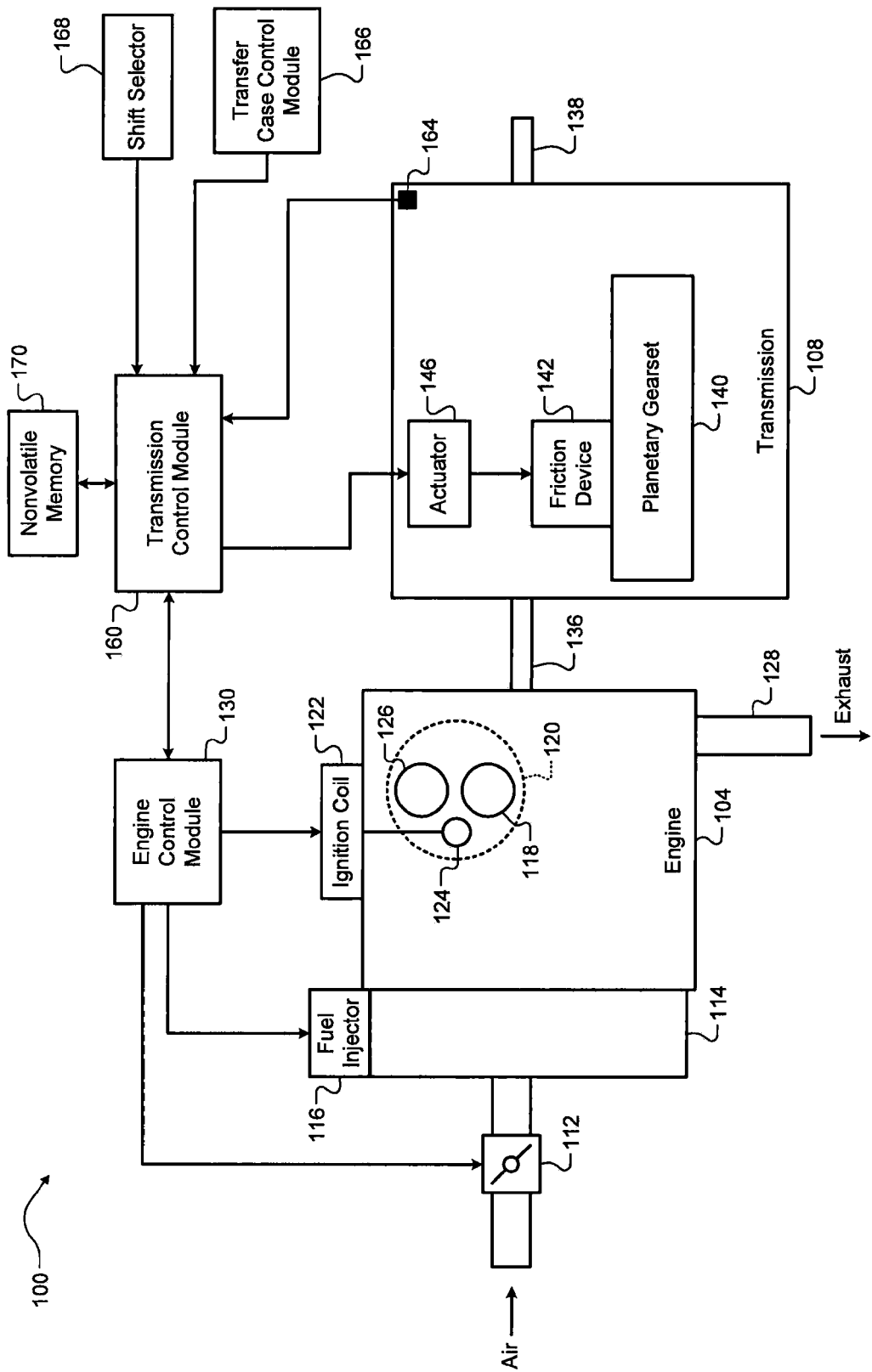
FIG. 1 is a functional block diagram of an exemplary vehicle powertrain system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
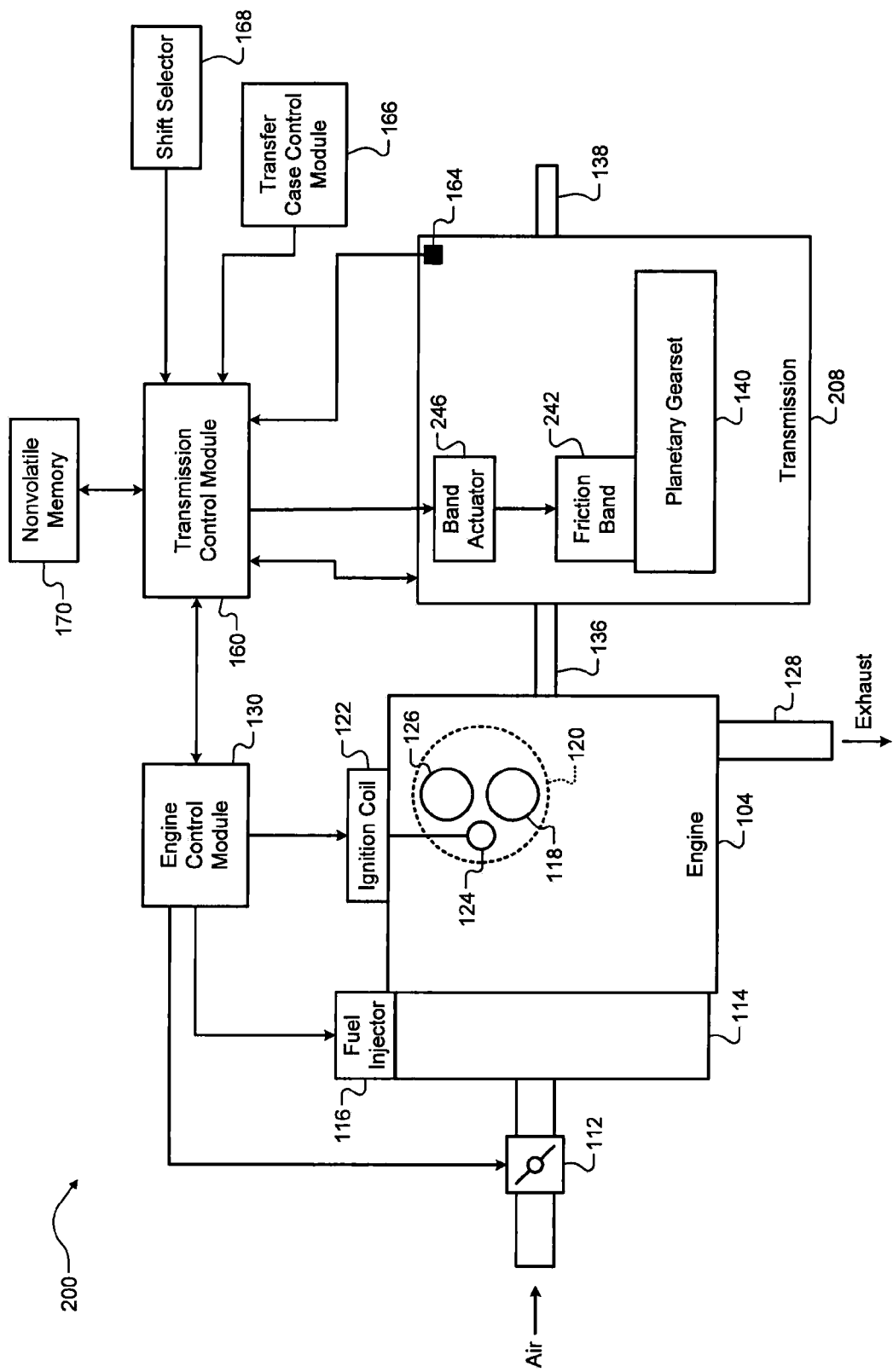
FIG. 2 is a functional block diagram of another exemplary vehicle powertrain system according to the principles of the present disclosure.

Referring now to FIGS. 1-2, functional block diagrams of exemplary vehicle powertrain systems 100 and 200, respectively, are presented. The vehicle includes an engine 104 and a transmission 108. Air is drawn through a throttle valve 112 into an intake manifold 114. An air-fuel mixture is created by injecting fuel from fuel injector 116 into the intake manifold 114. The air-fuel mixture is drawn through an intake valve 118 into a representative cylinder 120. Alternatively, the fuel injector 116 may inject fuel directly into the cylinder 120.

An ignition coil 122 activates a spark plug 124 to ignite the air-fuel mixture within the cylinder 120. After ignition, an exhaust valve 126 is opened to allow the cylinder 120 to vent the products of combustion to an exhaust system 128. An engine control module (ECM) 130 receives signals from various sensors (not shown), such as an engine coolant temperature sensor, a mass airflow sensor, a manifold absolute pressure sensor, and/or any other suitable sensor. The ECM 130 controls various actuators of the engine 104 to control torque output by the engine 104. For example, the ECM 130 controls the fuel injector 116, the throttle valve 112, and the ignition coil 122.

Torque from the engine 104 is output to the transmission 108 via a transmission input shaft 136. The transmission 108 outputs the torque to a driveline (not shown) via a transmission output shaft 138. The driveline is linked to wheels of the vehicle. The ratio between the speeds of the transmission input and output shafts 136 and 138 is controlled by a planetary gearset 140 and will be referred to as the transmission ratio.

In various implementations, the planetary gearset 140 may be a complex planetary gearset, such as one including one ring gear, two sun gears, and two sets of planet gears. In other implementations, the planetary gearset 140 may include two or more complete sets of planetary gears, components of which can be connected to each other and to the input and output of the planetary gearset 140.

The transmission ratio is determined based on which of the components of the planetary gearset 140 are held stationary and/or connected to each other. Components of the planetary gearset 140 are controlled by a plurality of friction devices, such as friction device 142. In various implementations, the friction device 142 includes one or more clutches. Each friction device, including the friction device 142, is controlled by an actuator, such as actuator 146. A transmission control module (TCM) 160 controls the actuators.

In other implementations, such as transmission 208 of FIG. 2, the friction device may include a friction band 242. The friction band 242 is controlled by a band actuator 246. For example only, the band actuator 246 may use hydraulic and/or electrical force to control a servo that adjusts tension of the friction band 242. The friction band 242 may also be used to engage one or more other gears, such as the fourth gear.

For simplicity of explanation only, the principles of the present application will be discussed as they relate to the friction device 142 and the actuator 146. The principles of the present application, however, are applicable to any suitable friction device and actuator, including the friction band 242 and the band actuator 246 of FIG. 2.

The TCM 160 communicates with the ECM 130. In various implementations, the TCM 160, the ECM 130, and/or one or other modules may be implemented as a single module. The TCM 160 receives signals from various sensors, such as a transmission ratio sensor 164 and a transmission fluid temperature sensor (not shown).

The transmission ratio sensor 164 determines the transmission ratio by dividing the rotational speed of the transmission input shaft 136 by the rotational speed of the transmission output shaft 138 and generates a signal accordingly. Alternatively, the TCM 160 may determine the transmission ratio based on signals corresponding to the speeds of the transmission input and output shafts 136 and 138.

Any suitable measure of the rotational speed of the transmission input and output shafts 136 and 138 may be used. For example, the speed of the transmission input shaft 136 may be determined based on engine speed, a turbine speed within a torque converter (not shown), and/or any other suitable measure of the transmission input speed (TIS). The speed of the transmission output shaft 138 may be determined based on wheel speed, a rotational speed of the driveline, and/or any other suitable measure of the transmission output speed (TOS).

The TCM 160 may also receive signals from a transfer case control module 166, such as may be implemented in a four-wheel-drive or all-wheel-drive vehicle. The TCM 160 receives signals from a shift selector 168, which is operated by a driver of the vehicle. For example only, the shift selector 168 may be a column-mounted or floor-mounted PRNDL lever. The shift selector 168 may also be configured to allow the driver to command upshifts and downshifts within the transmission 108.

The TCM 160 controls gear shifting within the transmission 108, including upshifts and downshifts. The TCM 160 may also instruct the ECM 130 to adjust torque output by the engine 104 during gear shifts. For example, the TCM 160 instructs the ECM 130 to reduce torque output by the engine 104 and reduce the speed of the engine 104 to complete an upshift of a transmission 108. The lower speed of the engine 104 matches the gear ratio of the oncoming gear that will be engaged within the transmission 108 when the upshift is completed. This reduction may be accomplished by, for example, retarding the spark timing, and the TCM 160 may instruct the ECM 130 by how much to reduce the spark.

The transmission 108 includes any suitable number of gears, such as four forward gears and one reverse gear. The first forward gear corresponds to the highest gear ratio, the second forward gear corresponds to the second-highest ratio, and etc. For simplicity of explanation only, an upshift from the first gear to the second gear will be described. The principles of the present application, however, apply to any suitable shift from a lower gear (i.e., a higher gear ratio) to a higher gear (i.e., a lower gear ratio).

The transmission 108 includes the friction device 142 that is engaged to shift from the first gear to the second gear. The friction device 142 mechanically links the second gear to one of the components of the planetary gearset 140 when the friction device 142 is engaged. When the coefficient of friction of the friction device 142 remains constant, the extent to which the friction device 142 is engaged corresponds to the amount of torque transferred to the second gear. For example only, the amount of torque transferred to the second gear increases as the friction device 142 is increasingly engaged. Engagement of the friction device 142 may also be referred to in terms of the extent to which the friction device 142 slips with respect to the second gear.

The TCM 160 controls the extent to which the friction device 142 is engaged via the actuator 146. In other words, the TCM 160 controls the slip of the friction device 142 with respect to the second gear and the amount of torque transferred to the second gear. When shifting from the first gear to the second gear, for example, a friction device associated with the first gear (not shown) is gradually released as the friction device 142 is increasingly engaged.

The transmission ratio decreases from the first gear ratio to the second gear ratio as the friction device 142 is increasingly engaged. Once the friction device 142 is fully engaged, the selected component of the planetary gearset 140 may be locked to the housing of the transmission 108. The linked components of the planetary gearset 140 are locked to each other and/or to the transmission input or output shafts 136 and 138. Once the friction device 142 is fully engaged, the torque output by the engine 104 is transferred to the second gear and is output from the transmission 108 via the second gear.

During normal operation, the TCM 160 adjusts the engagement of the friction device 142 based on data stored in non-volatile memory 170. In other words, the TCM 160 adjusts the amount of torque transferred to the second gear based on the data stored in the nonvolatile memory 170. For example, based on the data of the nonvolatile memory 170, the TCM 160 decreases engagement of the friction device 142 as the end of the upshift nears. This decrease is calibrated to allow the friction device 142 to slip to a limited degree with respect to the second gear and smooth any difference between the TIS and the TOS when the second gear is fully engaged. In this manner, the decrease provides a desired shift feeling for the driver.

In some circumstances, however, the decrease in engagement during the upshift prevents the transmission ratio from completely decreasing to the second gear ratio. An increase in engagement of the friction device 142 to fully engage the friction device 142 and fully engage the second gear then causes the vehicle to accelerate momentarily. Such an event is referred to as upshift run-through event.

The TCM 160 according to the principles of the present application detects upshift run-through events and increases engagement of the friction device 142 when an upshift run-through event occurs. In other words, the TCM 160 increases torque transferred to the second gear when an upshift run-through event occurs, thereby adjusting the transmission ratio toward the second gear ratio.

The TCM 160 detects upshift run-through events based on the transmission ratio and the period of time elapsed after an upshift is commanded. More specifically, the TCM 160 detects an upshift run-through event when the transmission ratio remains at the first gear ratio for a predetermined period of time after the upshift is commanded.

Figure 3:
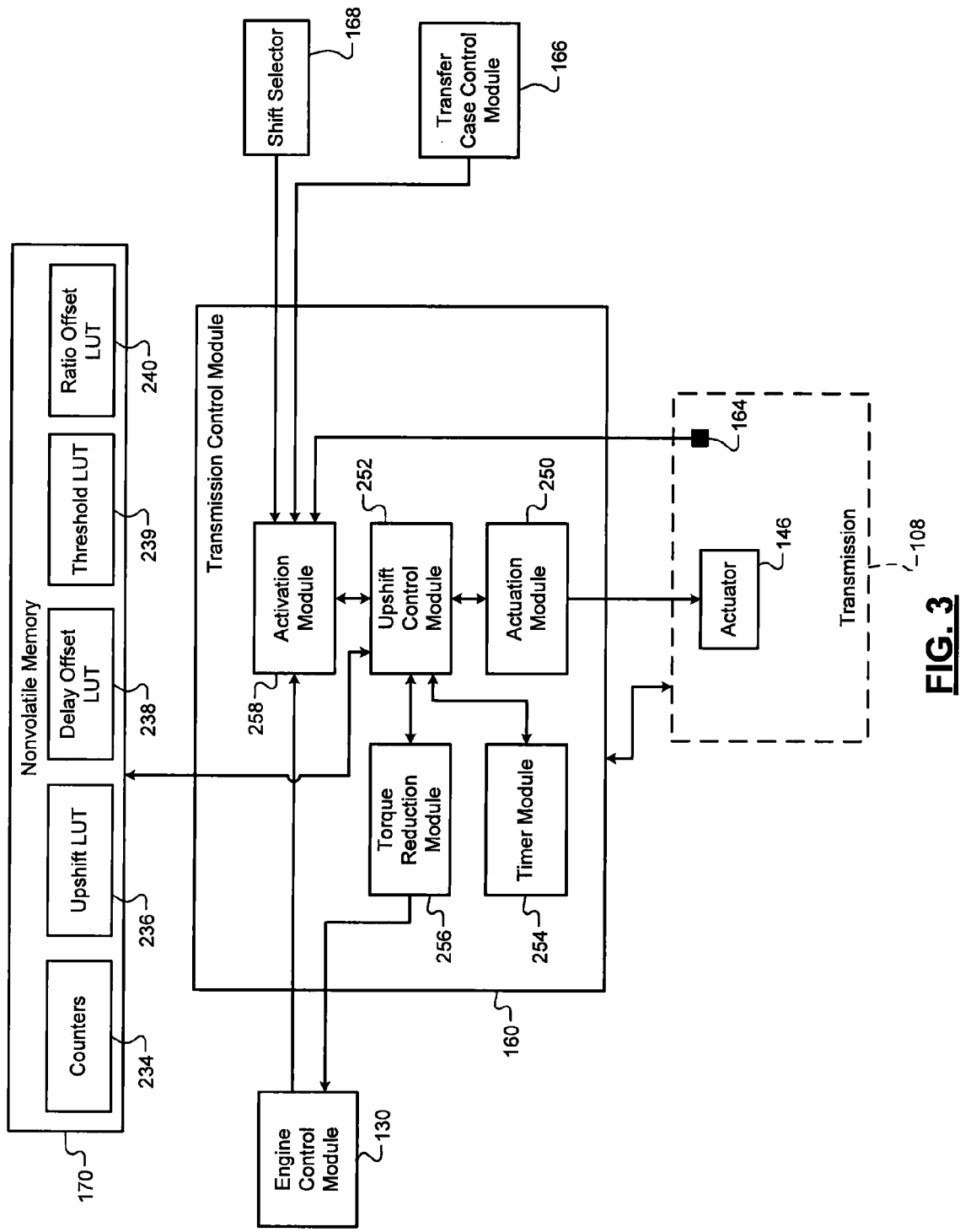
FIG. 3 is a functional block diagram of an exemplary implementation of a transmission control module (TCM) according to the principles of the present disclosure.

The TCM 160 also detects upshift run-through events based on the transmission ratio as the transmission ratio decreases from the first gear ratio to the second gear ratio. More specifically, the TCM 160 detects an upshift run-through event when the slope of the transmission ratio is greater than a threshold. Increasing the amount of torque transferred to the second gear and adjusting the transmission ratio toward the second gear ratio eliminates or mitigates any undesired shift feeling that the driver may otherwise experience when the second gear is engaged Referring now to FIG. 3, a functional block diagram of an exemplary implementation of the TCM 160 is presented. Various calibratable parameters for shifting and control of the transmission 108 are stored in the nonvolatile memory 170. For example, counters 234 may track the number of upshift run-through events that has been detected, either for a single key cycle or for the life of the vehicle. The counters 234 may be read and/or cleared by a service technician to diagnose the upshift run-through events in the transmission 108. The nonvolatile memory 170 also includes one or more lookup tables (LUTs), such as an upshift LUT 236, a delay offset LUT 238, a threshold LUT 239, and a ratio offset LUT 240, each of which are described further below.

The TCM 160 includes an actuation module 250 that controls the actuators of the transmission 108, including the actuator 146. In this manner, the actuation module 250 controls torque transfer to each of the gears and, therefore, the transmission ratio. More specifically, the actuation module 250 controls torque transfer to the second gear.

The actuation module 250 is selectively controlled by an upshift control module 252. The actuation module 250 is controlled by another module or system (not shown) of the TCM 160 during normal operation. During normal operation, torque transfer to the second gear is controlled based on data from the upshift LUT 236. The upshift control module 252 intervenes and controls the actuation module 250 to mitigate a detected upshift run-through event.

The upshift control module 252 receives an indicator that an upshift has been initiated. For example, the upshift control module 252 may receive a signal from a source, such as a shift control module (not shown) of the TCM 160. An activation module 258 also receives the indicator that an upshift has been initiated and selectively activates the upshift control module 252 when upshift run-through mitigation should be performed.

A torque reduction module 256 selectively instructs the ECM 130 to reduce torque output by the engine 104 and/or the engine speed during the upshift. A timer module 254 may be implemented within the TCM 160 and may be used for various applications. For example, the timer module 254 may be used as an indicator of the phase that the upshift is currently undergoing.

The first phase of an upshift is a delay phase, in which the actuation module 250 pre-fills hydraulic passageways and/or builds hydraulic pressure that can be used to engage the friction device 142 with the second gear. In this manner, the pressure can be used to increase the amount of torque transferred to the second gear.

The inertia phase of the upshift follows the delay phase, where the friction device 142 begins engaging and torque is transferred to the second gear via the friction device 142. The amount of torque transferred to the second gear is based on the extent to which the friction device 142 is engaged. Eventually, the friction device 142 is fully engaged, the second gear is engaged, and torque is transferred to the wheels of the vehicle via the second gear.

The timer module 254 may also be used as an indicator of the period of time elapsed since an upshift was initiated (i.e., commanded). The activation module 258 expects that the delay phase will end within a predetermined period of time after the upshift was initiated. In other words, the activation module 258 expects that the inertia phase will begin within the predetermined period after the upshift was initiated. Failure of the inertia phase to begin within that time may cause an upshift run-through event as there may be insufficient time to complete the upshift.

The activation module 258 monitors the timer module 254 and determines the period of time elapsed since the upshift was initiated. The activation module 258 selectively activates the upshift control module 252 based on the transmission ratio at a predetermined period after the upshift was initiated (i.e., commanded). More specifically, the activation module 258 selectively activates the upshift control module 252 based on a comparison of the transmission ratio with the first gear ratio at the predetermined period.

For example, the activation module 258 activates the upshift control module 252 when the transmission ratio is not less than the first gear ratio after the predetermined period. In other words, the activation module 258 may activate the upshift control module 252 when the transmission ratio is equal to the first gear ratio after the predetermined period. As the transmission ratio is expected to decrease from the first gear ratio to the second gear ratio to complete the upshift, the inertia phase has not yet begun if the transmission ratio is not less than the first gear ratio. The predetermined period of time may be calibratable and may be set to, for example, 0.7 seconds.

The upshift control module 252 selectively increases the engagement of the friction device 142 when the upshift control module 252 is activated. The increased engagement of the friction device 142 increasingly engages the second gear, increases torque transfer to the second gear, and adjusts the transmission ratio toward the second gear ratio. The upshift control module 252 commands this increased engagement until the inertia phase begins. If the inertia phase does not begin, however, the upshift control module 252 may further increase the engagement of the friction device 142 to increase torque transfer to the second gear.

When the inertia phase has not begun after the predetermined period, the upshift control module 252 determines how much to increase the engagement of the friction device 142 based on data from the delay offset LUT 238. For example only, the delay offset LUT 238 includes a mapping of increases indexed by the period of time elapsed since the inertia phase was expected to begin, the oncoming gear or gear ratio, and/or the shift torque. For example only, the engagement increases of the delay offset LUT 238 may increase as the period of time increases, as the oncoming gear ratio decreases, and/or as the shift torque increases.

The shift torque is determined based on, for example, engine speed and air torque of the engine 104. The air torque of the engine 104 corresponds to a maximum amount of torque that the engine 104 is capable of producing at the current engine speed and under the current airflow conditions (e.g., mass airflow, air-per-cylinder, manifold absolute pressure, etc.). The activation module 258 deactivates the upshift control module 252 when the inertia phase begins. Control of the engagement of the friction device 142 and torque transfer to the second gear then returns to the normal manner of control.

During the inertia phase, the activation module 258 determines the slope of the transmission ratio and a threshold for the transmission ratio. The activation module 258 determines the slope of the transmission ratio at a predetermined rate, such as once every 25.0 ms. The activation module 258 may determine the slope in any suitable manner. In various implementations, the activation module 258 may determine the slope by calculating a derivative value of the transmission ratio. For example only, the activation module 258 may calculate the derivative value using an eight-point Savitzky-Golay filter.

The activation module 258 determines the threshold for the transmission ratio based on the transmission ratio and the shift torque. When the derivative value is used as the indicator of the slope of the transmission value, the threshold may be referred to as a derivative threshold. The activation module 258 determines the threshold from the threshold LUT 239.

The threshold LUT 239 includes a mapping of thresholds indexed by transmission ratio and shift torque. The threshold corresponds to a maximum slope for the transmission ratio which will produce a desired shift feel for the driver. When the derivative value is calculated, the derivative threshold corresponds to a maximum allowable derivative value for the transmission ratio which will produce a desired feeling for the driver.

The activation module 258 selectively activates the upshift control module 252 based on a comparison of the slope of the transmission ratio and the threshold. More specifically, the activation module 258 activates the upshift control module 252 when the slope is greater than the threshold. Where the derivative value is used to calculate the slope, the activation module 258 activates the upshift control module 252 when the derivative value is greater than the derivative threshold.

In some implementations, the activation module 258 may require that the slope exceed the threshold by at least a predetermined amount or percentage. In other words, the activation module 258 may activate the upshift control module 252 when the slope is greater than the threshold by at least the predetermined amount. The predetermined amount may correspond to an allowable amount of tolerance and may be set to, for example, 20.0 percent of the threshold.

As stated above, the upshift control module 252 increases the engagement of the friction device 142 and the amount of torque transferred to the second gear when the upshift control module 252 is activated by the activation module 258. The upshift control module 252 determines the increase using the ratio offset LUT 240 when activated due to the slope of the transmission ratio being greater than the threshold (i.e., during the inertia phase).

The ratio offset LUT 240 includes a mapping of engagement increases indexed by the shift torque, the difference between the slope and the threshold, and the period of time during which the slope has been greater than the threshold. These increases correspond to adjustments of the friction device 142 necessary to increase the torque transferred to the second gear and adjust the transmission ratio to a desired transmission ratio. Accordingly, adjusting the friction device 142 based on these increases produces a desired shift feel.

Figure 4:
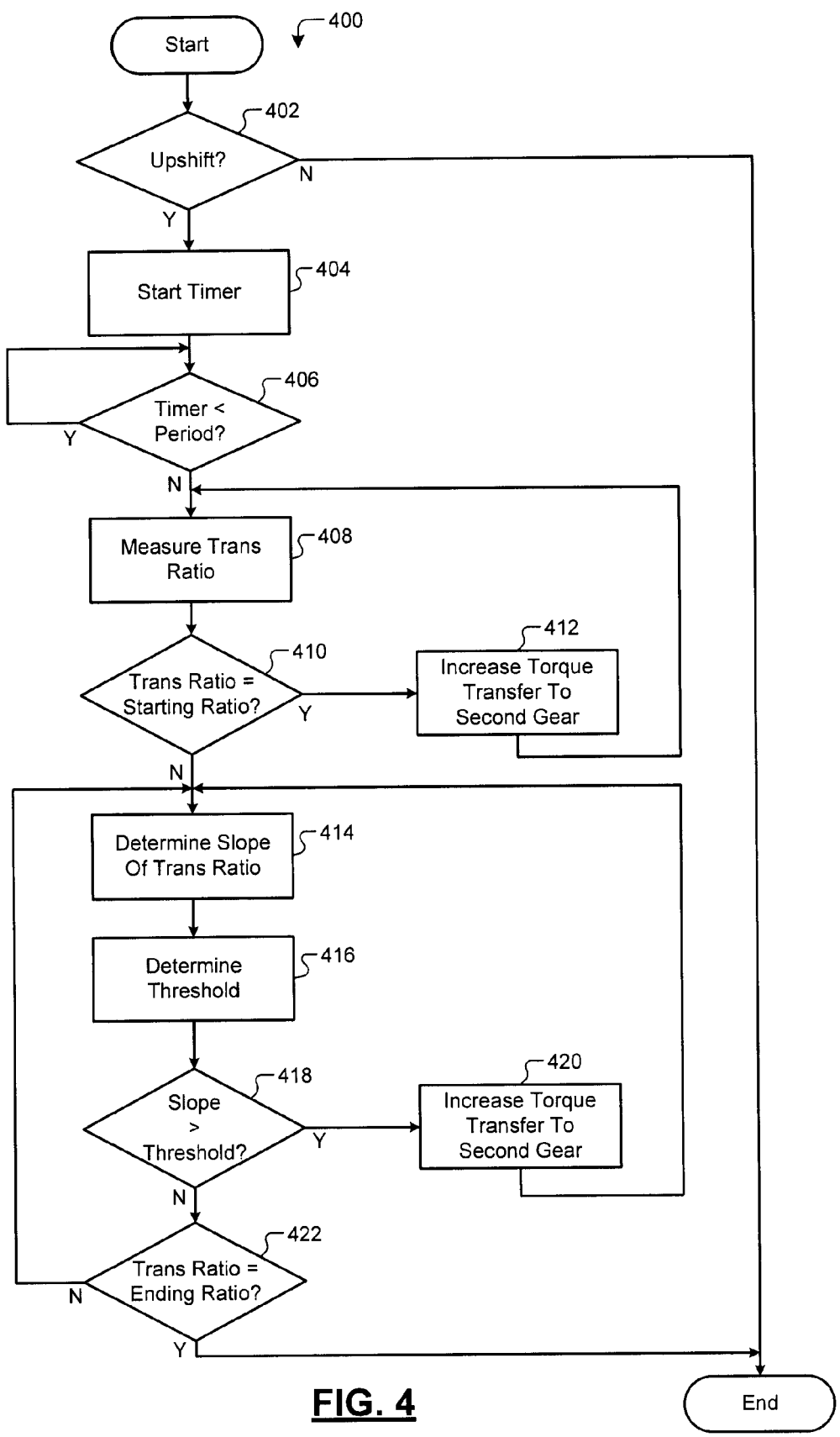
FIG. 4 is a flowchart depicting an exemplary method performed by the TCM according to the principles of the present disclosure.

Referring now to FIG. 4, a flowchart depicting an exemplary method 400 performed by the TCM 160 is presented. Control begins in step 402 where control determines whether an upshift has been initiated (i.e., commanded). If true, control continues to step 404. If false, control ends. In step 404, control starts the timer.

Control proceeds to step 406, where control determines whether the timer is less than the predetermined period of time. If true, control remains in step 406. If false, control continues to step 408. The predetermined period of time corresponds to the time at which control expects the inertia phase to have begun. In other words, the predetermined period of time corresponds to the time at which control expects that the transmission ratio will have at least begun to decrease from the first gear ratio to the second gear ratio.

Control measures the transmission ratio in step 408. Control proceeds to step 410 where control determines whether the transmission ratio is equal to the starting ratio (e.g., the first gear ratio). If true, control transfers to step 412. If false, control proceeds to step 414. In step 412, control increases the amount of torque transferred to the second gear. Control increases torque transfer to the second gear by increasing the extent to which the friction device 142 is engaged with the second gear. Control may determine how much to increase the engagement of the friction device 142 using the delay offset LUT 238. Control then returns to step 408.

In step 414, control determines the slope of the transmission ratio. Control may determine the slope of the transmission ratio in any suitable manner, such as by determining the derivative value of the transmission ratio. For example only, control may calculate the derivative value using the eight-point Savitzky-Golay filter. Control continues to step 416 where control determines the threshold. For example only, control determines the threshold using the threshold LUT 239 based on the transmission ratio and the shift torque.

Control determines whether the slope of the transmission ratio is greater than the threshold in step 418. When the derivative is used to calculate the slope of the transmission ratio, control determines whether the derivative value is greater than the derivative threshold in step 418. If true, control transfers to step 420. If false, control continues to step 422.

Control increases the amount of torque transferred to the second gear in step 420. Control increases the amount of torque transferred to the second gear by increasing the engagement of the friction device 142. Control may determine how much to increase the engagement of the friction device 142 using the ratio offset LUT 240 based on the difference between the slope and the threshold, the shift torque, and/or the period of time during which the slope has been greater than the threshold. Control then returns to step 414.

In step 422, control determines whether the transmission ratio is equal to the ending ratio (e.g., the second gear ratio). If true, control ends as the upshift is complete, and the second gear is engaged. If false, control returns to step 414. While control is shown as ending after steps 402 or 422 are performed, control may instead return to step 402. In this manner, control continuously operates during vehicle operation.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system for a transmission of a vehicle, wherein said transmission has a first gear that corresponds to a first transmission ratio and a second gear that corresponds to a second transmission ratio that is less than said first transmission ratio, the control system comprising:
   an actuation module that controls an amount of torque transferred to said second gear using a friction device; and
   an upshift control module that selectively increases said amount of torque transferred to said second gear based on a comparison of said first transmission ratio and a measured transmission ratio at a predetermined period of time after an upshift to said second gear is commanded,
   wherein said measured transmission ratio is determined based on an input speed of said transmission divided by an output speed of said transmission.

2. The control system of claim 1 wherein said upshift control module increases said amount of torque transferred to said second gear when said measured transmission ratio is equal to said first transmission ratio at said predetermined period after said shift to said second gear is commanded.

3. The control system of claim 1 wherein said upshift control module increases said amount of torque transferred to said second gear based on at least one of a shift torque, said second transmission ratio, and a period of time based on a current time and said predetermined period.

4. The control system of claim 1 wherein said friction device comprises a friction band.

5. The control system of claim 1 wherein said first transmission ratio corresponds to a highest transmission ratio of said transmission and said second transmission ratio corresponds to a second-highest transmission ratio of said transmission.

6. The control system of claim 1 wherein said upshift control module increases said amount of torque transferred to said second gear when a slope of said measured transmission ratio is greater than a threshold, said measured transmission ratio is less than said first transmission ratio, and said measured transmission ratio is greater than said second transmission ratio.

7. The control system of claim 6 wherein said upshift control module increases said amount of torque transferred to said second gear based on at least one of a shift torque, a difference between said slope and said threshold, and a period of time during which said slope is greater than said threshold.

8. The control system of claim 6 wherein said threshold is determined based on said measured transmission ratio and a shift torque.

9. The control system of claim 6 wherein said slope is determined based on a derivative of said measured transmission ratio.

10. The control system of claim 6 wherein said slope is determined based on an eight-point Savitzky-Golay filter.

11. A control system for a transmission of a vehicle, wherein said transmission has a first gear that corresponds to a first transmission ratio and a second gear that corresponds to a second transmission ratio that is less than said first transmission ratio, the control system comprising:
    an actuation module that controls an amount of torque transferred to said second gear using a friction device; and
    an upshift control module that increases said amount of torque transferred to said second gear when a slope of a measured transmission ratio is greater than a threshold, said measured transmission ratio is greater than said second ratio, and said measured transmission ratio is less than said first ratio,
    wherein said measured transmission ratio is determined based on an input speed of said transmission divided by an output speed of said transmission.

12. The control system of claim 11 wherein said upshift control module increases said amount of torque transferred to said second gear based on at least one of a shift torque, a difference between said slope and said threshold, and a period of time during which said slope is greater than said threshold.

13. The control system of claim 11 wherein said threshold is determined based on said measured transmission ratio and a shift torque.

14. The control system of claim 11 wherein said slope is determined based on a derivative of said measured transmission ratio.

15. The control system of claim 11 wherein said slope is determined based on an eight-point Savitzky-Golay filter.

16. The control system of claim 11 wherein said friction device comprises a friction band.

17. The control system of claim 11 wherein said first transmission ratio corresponds to a highest transmission ratio of said transmission and said second transmission ratio corresponds to a second-highest transmission ratio of said transmission.

* * * * *